(12) United States Patent  (10) Patent No.: US 9,041,874 B2
Chang  (45) Date of Patent: May 26, 2015

(54) LIQUID CRYSTAL DISPLAY HAVING SHIELDING CONDUCTOR

(75) Inventor: Jong Woong Chang, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 379 days.

(21) Appl. No.: 13/551,372

(22) Filed: Jul. 17, 2012

(65) Prior Publication Data

US 2013/0242215 A1    Sep. 19, 2013

(30) Foreign Application Priority Data

Mar. 19, 2012 (KR) .................. 10-2012-0027723

(51) Int. Cl.
*G02F 1/1333* (2006.01)
*G02F 1/1345* (2006.01)
*G02F 1/1362* (2006.01)
*G02F 1/1343* (2006.01)

(52) U.S. Cl.
CPC .... *G02F 1/136204* (2013.01); *G02F 1/134363* (2013.01); *G02F 2001/133388* (2013.01); *G02F 2001/136218* (2013.01)

(58) Field of Classification Search
USPC .......................................................... 349/40
See application file for complete search history.

(56) References Cited

U.S. PATENT DOCUMENTS

| 6,445,039 | B1 | 9/2002 | Woo et al. |
|---|---|---|---|
| 6,963,110 | B2 | 11/2005 | Woo et al. |
| 7,115,952 | B2 | 10/2006 | Woo et al. |
| 7,417,303 | B2 | 8/2008 | Woo et al. |
| 7,687,858 | B2 | 3/2010 | Woo et al. |
| 7,692,247 | B2 | 4/2010 | Woo et al. |
| 7,719,083 | B2 | 5/2010 | Chang |
| 8,035,162 | B2 | 10/2011 | Woo et al. |
| 2003/0184699 | A1 | 10/2003 | Matsumoto et al. |
| 2006/0056001 | A1 | 3/2006 | Taguchi et al. |
| 2009/0310055 | A1 | 12/2009 | Kim et al. |
| 2010/0079694 | A1* | 4/2010 | Yoshida et al. ............... 349/40 |
| 2010/0201900 | A1* | 8/2010 | Lee et al. ....................... 349/40 |
| 2010/0245012 | A1 | 9/2010 | Chang |

FOREIGN PATENT DOCUMENTS

| KR | 1020070072141 | 7/2007 |
|---|---|---|
| KR | 1020080003114 | 1/2008 |
| KR | 1020080026850 | 3/2008 |
| KR | 1020080076360 | 8/2008 |
| KR | 1020090049981 | 5/2009 |
| KR | 1020100095988 | 9/2010 |
| KR | 1020110035145 | 4/2011 |

* cited by examiner

*Primary Examiner* — Wen-Ying P Chen
(74) *Attorney, Agent, or Firm* — H.C. Park & Associates, PLC

(57) ABSTRACT

Provided is a liquid crystal display including, on an insulation substrate having a polygonal display area and a peripheral area surrounding the display area a first signal line, a second signal line crossing the first signal line, a plurality of switching elements connected to the first signal line and the second signal line and disposed in the display area, a plurality of pixel electrodes each connected to the switching element and disposed in the display area, and a shielding conductor disposed in the peripheral area and extending along at least one side of the polygonal display area.

17 Claims, 15 Drawing Sheets

LIQUID CRYSTAL DISPLAY HAVING SHIELDING CONDUCTOR

CROSS-REFERENCE TO RELATED APPLICATION

This application claims priority from and the benefit of Korean Patent Application No. 10-2012-0027723 filed on Mar. 19, 2012, which is hereby incorporated by reference for all purposes as if fully set forth herein.

BACKGROUND OF THE INVENTION

1. Field of the Invention

Exemplary embodiment of the present invention relate to a liquid crystal display having a shielding conductor formed to prevent static electricity.

2. Discussion of the Background

A liquid crystal display (LCD) is a display device that is most often used as a television, a monitor and the like. The LCD displays an image by using a liquid crystal layer between two substrates, on which an electrode and a switching element are formed, and applying an electric field to the liquid crystal layer to control the liquid crystals direction thereby controlling transmittance of light through the liquid crystals.

The manufacturing of LCD displays includes a process of forming several layers of thin films on an insulation substrate and patterning the layers, a process of rubbing an alignment layer, a process of testing a formed wiring, and other processes. During these processes, it can happen that static electricity inflows or arises causing damage to devices such as the thin film transistors and the wiring formed on an insulation substrate.

The following are examples of ways in which static electricity can appear and cause damage to devices: scratches may form on the wiring, for example, caused by a probe during a wiring test, wherein the scratched portion acts as a lightning rod causing sparks may break insulating layers; sparks may be generated because of an insulating layer that includes a portion with poor insulating properties due to, for example, defects of an organic insulating layer, and the sparks break the insulating layer; and static electricity may arise due to friction during the process of rubbing an alignment layer to break a weak portion in a display area and other processes.

The above information disclosed in this Background section is only for enhancement of understanding of the background of the invention and therefore it may contain information that does not form any part of the prior art.

SUMMARY OF THE INVENTION

Exemplary embodiments of the present invention provide a liquid crystal display having a structure that can prevent device damage due to static electricity.

Additional features of the invention will be set forth in the description which follows, and in part will be apparent from the description, or may be learned by practice of the invention.

An exemplary embodiment of the present invention provides a liquid crystal display, including: a first insulation substrate having a polygonal display area and a peripheral area surrounding a peripheral side thereof, a first signal line formed on the first insulation substrate, a second signal line formed on the first insulation substrate and crosses the first signal line, a plurality of switching elements connected to the first signal line and the second signal line and disposed in the display area, a plurality of pixel electrodes each connected to the switching element and disposed in the display area, and a shielding conductor disposed in the peripheral area and extending along at least one side of the polygonal display area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
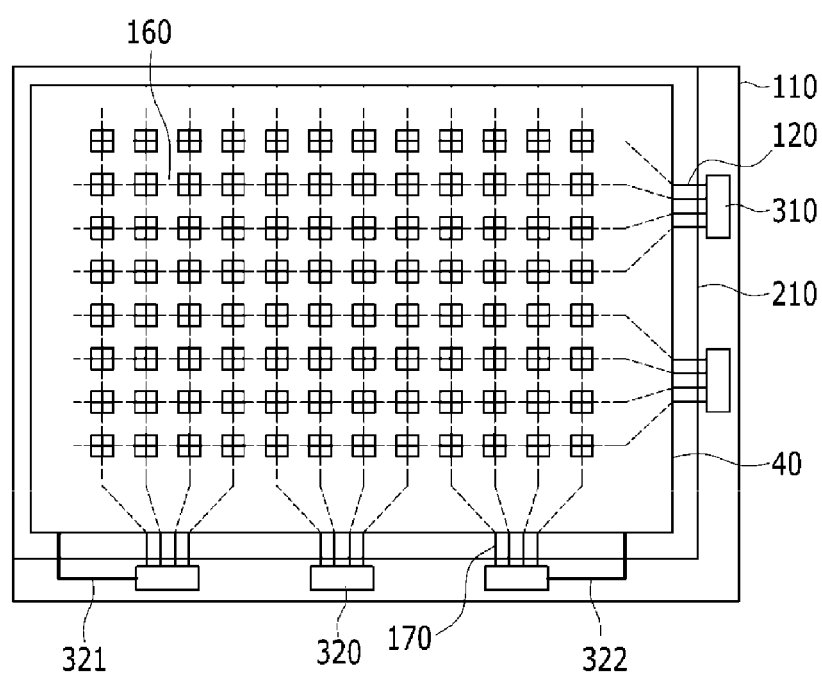
FIG. 1 is a top plan view of a liquid crystal display according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A liquid crystal display according to a first exemplary embodiment of the present invention will be described in detail with reference to FIG. 1 and FIG. 2.

Figure 2:
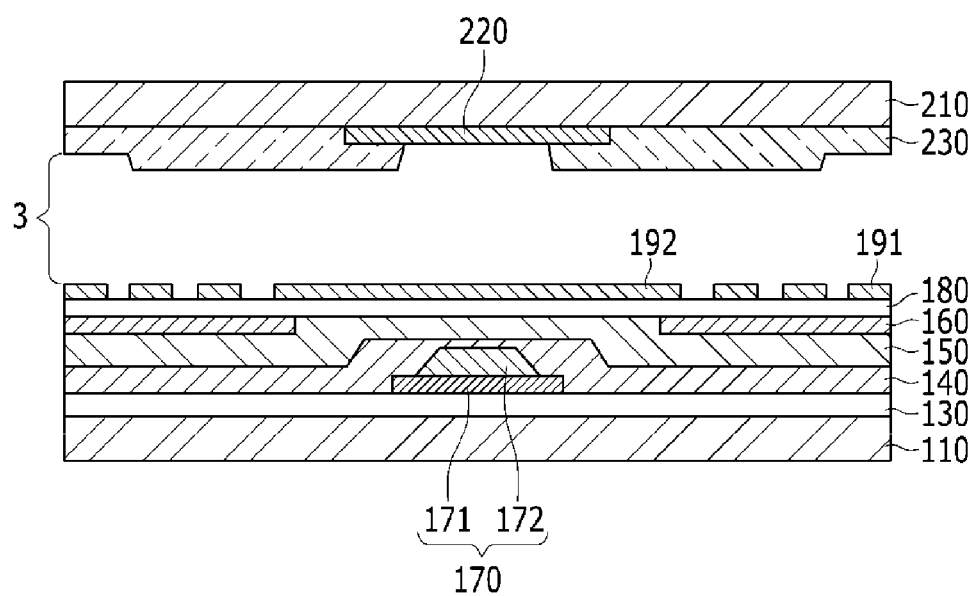
FIG. 2 is a partial cross-sectional view of the liquid crystal display according to the first exemplary embodiment of the present invention.

FIG. 1 is a top plan view of a liquid crystal display according to the first exemplary embodiment of the present invention, and FIG. 2 is a partial cross-sectional view of the liquid crystal display according to the first exemplary embodiment of the present invention.

The liquid crystal display illustrated in FIG. 1 is a PLS (plane to line switching) type liquid crystal display where liquid crystals are aligned in parallel to a surface of a display panel, and may include a lower panel, an upper panel facing the lower panel, a liquid crystal layer 3 interposed between the lower panel and the upper panel and the like.

The lower panel includes an insulation substrate 110, a thin film transistor (not shown) disposed on the insulation substrate 110, and a pixel electrode 191 connected to the thin film transistor. The lower panel further includes signal lines such as a gate line 120 extending in a horizontal direction and a data line 170 extending in a vertical direction and crossing the gate line 120 such that the gate line and the data line are insulated from each other. The lower panel further includes a medium electrode 160 acting as an opposed electrode of the pixel electrode 191 and integrally formed over the entire display area of the insulation substrate 110, a shielding electrode 192 formed on the data line 170 and the like, and a shielding conductor 40 formed in a peripheral area outside the display area, surrounding the display area, and connected to the medium electrode 160. Further, the lower panel includes a gate insulating layer 130, a first passivation layer 140, an organic insulating layer 150, a second passivation layer 180 and the like that insulate the conductors such as the signal lines, the thin film transistor, the pixel electrode 191, the medium electrode 160, the shielding electrode 192, and the shielding conductor 40. In addition, an alignment layer (not shown) for aligning liquid crystals is formed on the pixel electrode 191. A gate driving circuit 310 for applying a scanning signal to the gate line 120 and a data driving circuit 320 for applying an image data signal to the data line 170 may be mounted on the lower panel.

The thin film transistor, acting as a switching element, independently applies an image voltage to each pixel electrode 191 and the drain electrode, the gate electrode, and the source electrode are respectively connected to the pixel electrode 191, the gate line 120, and the data line 170. The medium electrode 160 and the pixel electrode 191 form an electric field that drives the liquid crystals. The medium electrode 160 is integrally formed over the entire display area except for partially removed portions through which contact holes (not shown) are formed to connect the pixel electrode 191 and the thin film transistor and the like. The function of the shielding electrode 192 is to prevent the voltage of the data line 170 from affecting the liquid crystal layer 3. The shielding electrode 192 is formed along the data line 170 at a position overlapping the data line 170 on the second passivation layer 180 and applied with a common voltage or the like. The shielding electrode 192 is formed of the same material as the pixel electrode 191 and on the same layer as the pixel electrode 191. The shielding electrode 192 may be formed of a transparent conductive material such as ITO (indium tin oxide), IZO (indium zinc oxide) or the like. The shielding conductor 40 is formed in a quadrangle loop shape and surrounds the quadrangle display area. The shielding conductor may be formed by any suitable material, including non-transparent conductive materials and transparent conductive materials. The shielding conductor 40 is formed on the same layer as the medium electrode 160 and is physically connected to the medium electrode 160. Alternatively, the shielding conductor 40 may be formed on the same layer as the pixel electrode 191. That is, the shielding conductor 40 may be formed of a transparent conductive material such as ITO (indium tin oxide), IZO (indium zinc oxide) or similar materials. The shielding conductor 40 receives a predetermined voltage such as a common voltage through dummy pins 321 and 322 of the data driving circuit 320. Alternatively the shielding conductor 40 may receive a predetermined voltage through the dummy pin of the gate driving circuit 310 or may receive a predetermined voltage such as a common voltage through both the dummy pins 321 and 322 of the data driving circuit 320 and the dummy pin of the gate driving circuit 310. The shielding conductor 40 includes a portion extending in a horizontal direction and a portion extending in a vertical direction, the portions having uniform width, such that the shielding conductor 40 may extend across both a gate fanout region and a data fanout region. The gate fanout region is the region where the interval between the gate lines 120 becomes narrower so that the gate lines 120 are connected to the gate driving circuit 310, whereas the data fanout region is the region where the interval between the data lines 170 becomes narrower so that the data lines 170 are connected to the data driving circuit 320.

The upper panel includes an insulation substrate 210, a black matrix 220, and a color filter 230 disposed on a lower surface of the insulation substrate 210. An alignment layer (not shown) for aligning liquid crystals is formed on the black matrix 220 and the color filter 230. The black matrix 220 is formed both in the peripheral area and in the display area. The black matrix 220 formed in the peripheral area may be disposed at a position overlapping the shielding conductor 40 of the lower panel.

Regarding the liquid crystal layer 3, the long axes of the liquid crystal molecules are parallel to the surfaces of the insulation substrates 110 and 210, and for a PLS type liquid crystal display the liquid crystal molecules are aligned to be parallel to each other.

Regarding the liquid crystal display of this invention, even if static electricity inflows or is generated in the liquid crystal display, it is possible to prevent the devices of the display area from being damaged by ensuring that the static electricity is dispersed to the shielding conductor 40 formed in the peripheral area.

The first exemplary embodiment describes the present invention as used in a PLS type of liquid crystal display. The present invented structure and method for protecting the devices of the display area from static electricity by disposing the shielding conductor 40 in the peripheral area may be used in liquid crystals displays employing other liquid crystal display modes such as a TN (Twisted Nematic) mode, a VA (vertical alignment) mode, and an IPS (In Plane Switching) mode.

Figure 3:
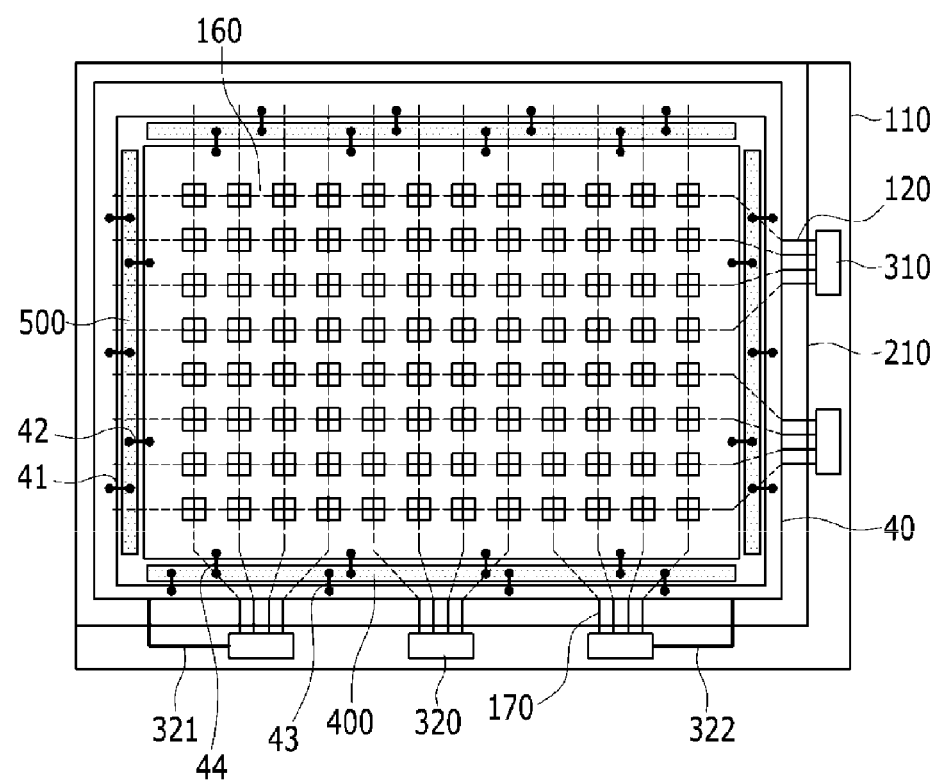
FIG. 3 is a top plan view of a liquid crystal display according to a second exemplary embodiment of the present invention.
Figure 4:
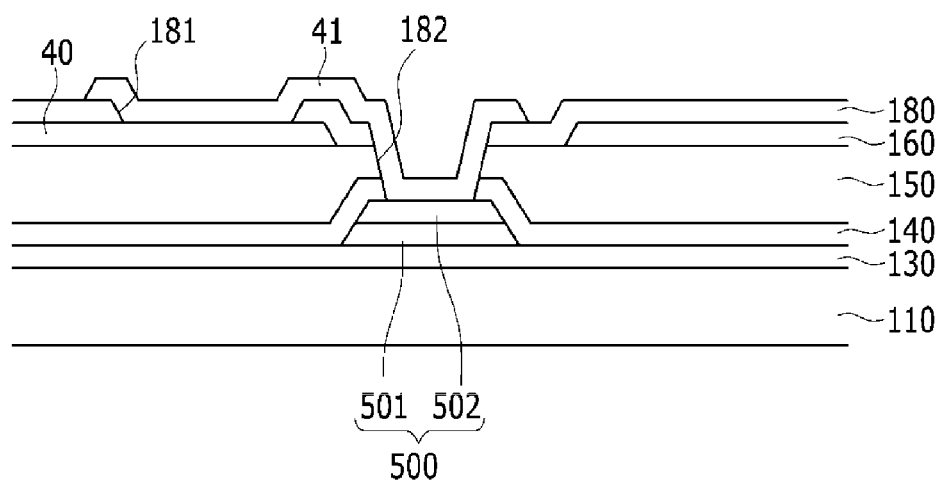
FIG. 4 is a cross-sectional view of a connection portion of a shielding conductor and a shorting bar in the liquid crystal display according to the second exemplary embodiment of the present invention.
Figure 5:
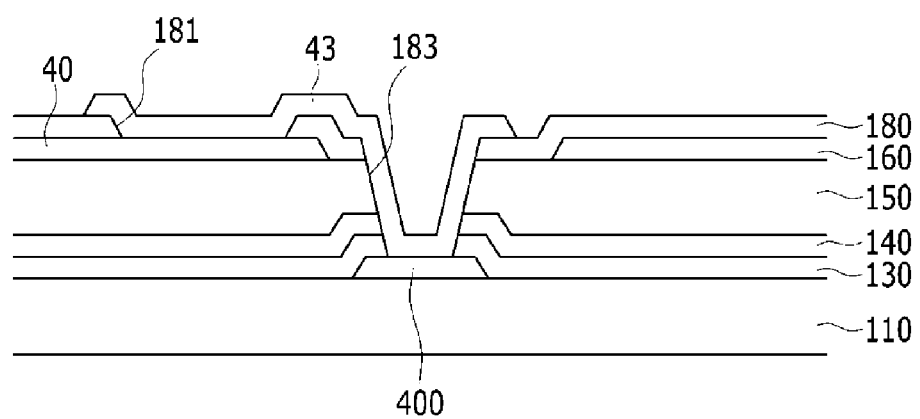
FIG. 5 is a cross-sectional view of a connection portion of a shielding conductor and a shorting bar in the liquid crystal display according to the second exemplary embodiment of the present invention.

FIG. 3 shows a top plan view of a liquid crystal display according to a second exemplary embodiment of the present invention, FIG. 4 shows a cross-sectional view of a connection portion of a shielding conductor and a shorting bar in the liquid crystal display according to the second exemplary embodiment of the present invention, and FIG. 5 is a cross-sectional view of a connection portion of a shielding conductor and a shorting bar in the liquid crystal display according to the second exemplary embodiment of the present invention.

The liquid crystal display according to the second exemplary embodiment of the present invention further includes a first shorting bar 400 and a second shorting bar 500 as compared to the liquid crystal display according to the first exemplary embodiment. The first shorting bar 400 and the second shorting bar 500 are formed in the peripheral area outside the display area. The first shorting bar 400 is formed of the same material as the gate line 120 and on the same layer as the gate line 120. The second shorting bar 500 is formed of the same material as the data line 170 and on the same layer as the data line 170. The second shorting bar 500 has a lower layer 501 and an upper layer 502 similar to the data line 170. The first shorting bar 400 is formed in parallel to the gate line 120, is connected through the first connection portion 43 to the shielding conductor 40, and is connected through the second connection portion 44 to the medium electrode 160. The second shorting bar 500 is formed in parallel to the data line 170, is connected through the third connection portion 41 to the shielding conductor 40, and is connected through the fourth connection portion 42 to the medium electrode 160. The shielding conductor 40 includes a portion extending in a horizontal direction and a portion extending in a vertical direction and the portions may be each formed to have uniform width.

Referring to FIG. 4 and FIG. 5, the structure of the first connection portion 43 and the third connection portion 41 is described in more detail.

A first shorting bar 400 is formed on the insulation substrate 110, where the shorting bar 400 is formed of the same material as the gate line 120 and on the same layer as the gate line 120. The gate insulating layer 130 is formed on the first shorting bar 400 and the second shorting bar 500 is formed on the gate insulating layer 130. The first passivation layer 140 and the organic insulating layer 150 are formed on the second shorting bar 500. The medium electrode 160 and the shielding conductor 40 are formed on the organic insulating layer 150. The second passivation layer 180 is formed on the medium electrode 160 and the shielding conductor 40. The second passivation layer 180 has a contact hole 181 exposing the shielding conductor 40. The gate insulating layer 130, the first passivation layer 140, the organic insulating layer 150, and the second passivation layer 180 have a contact hole 183 formed therethrough to expose the first shorting bar 400. In addition, the first passivation layer 140, the organic insulating layer 150, and the second passivation layer 180 have a contact hole 182 formed therethrough to expose the second shorting bar 500. The first connection portion 43 connecting the shielding conductor 40 and the first shorting bar 400 through the contact holes 181 and 183 is formed on the second passivation layer. The third connection portion 41 connecting the shielding conductor 40 and the second shorting bar 500 through the contact holes 181 and 182 is formed on the second passivation layer 180.

Since the connection structure of the second connection portion 44 and the fourth connection portion 42 is the same as the connection structure of the first connection portion 43 and the third connection portion 41, except that the contact hole 181 of the second passivation layer exposes the medium electrode 160 instead of the shielding conductor 40, a description thereof will be omitted.

The shielding conductor 40 may be formed on various layers of the liquid crystal display. For example, the shielding conductor 40 may be formed, like the pixel electrode 191, on the second passivation layer 180. The third exemplary embodiment presents such a situation.

Figure 6:
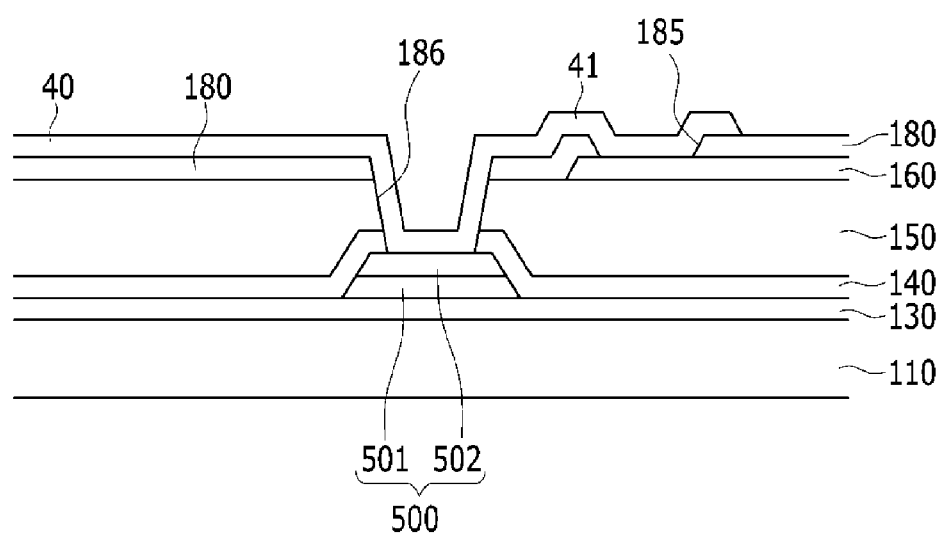
FIG. 6 is a cross-sectional view of a connection portion of a shielding conductor, a shorting bar, and a medium electrode in a liquid crystal display according to a third exemplary embodiment of the present invention.
Figure 7:
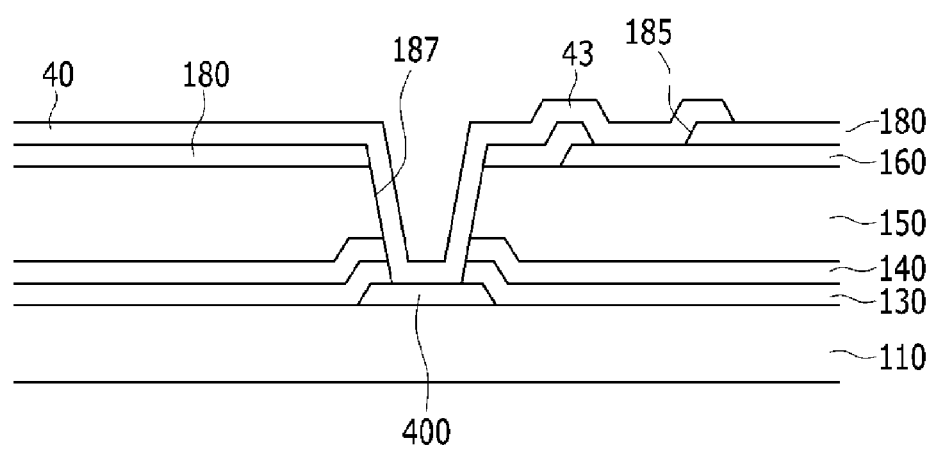
FIG. 7 is a cross-sectional view of a connection portion of a shielding conductor, a shorting bar, and a medium electrode in the liquid crystal display according to the third exemplary embodiment of the present invention.

FIG. 6 shows a cross-sectional view of a connection portion of a shielding conductor, a shorting bar, and a medium electrode in a liquid crystal display according to a third exemplary embodiment of the present invention. FIG. 7 shows a cross-sectional view of a connection portion of a shielding conductor, a shorting bar, and a medium electrode in the liquid crystal display according to the third exemplary embodiment of the present invention.

A first shorting bar 400 is formed on the insulation substrate 11. The shorting bar 400 is formed of the same material as the gate line 120 and on the same layer as the gate line 120. The gate insulating layer 130 is formed on the first shorting bar 400 and the second shorting bar 500 is formed on the gate insulating layer 130. The first passivation layer 140 and the organic insulating layer 150 are formed on the second shorting bar 500. A medium electrode 160 is formed on the organic insulating layer 150 and a second passivation layer 180 is formed on the medium electrode 160. The second passivation layer 180 has a contact hole 185 exposing the medium electrode 160. The gate insulating layer 130, the first passivation layer 140, the organic insulating layer 150, and the second passivation layer 180 have a contact hole 187 formed therethrough to expose the first shorting bar 400. Further, the first passivation layer 140, the organic insulating layer 150, and the second passivation layer 180 have a contact hole 186 formed therethrough to expose the second shorting bar 500. The shielding conductor 40, the first connection portion 43, and the second connection portion 41 are formed on the second passivation layer 180. The first connection portion 43 connects the shielding conductor 40, the first shorting bar 400, and the medium electrode 160 through the contact holes 185 and 187. The third connection portion 41 connects the shielding conductor 40, the second shorting bar 500, and the medium electrode 160 through the contact holes 185 and 186. The first connection portion 43 and the second connection portion 41 are formed on the same layer as the shielding conductor 40 to be directly connected without a separate contact hole. As described above, the first connection portion 43 may simultaneously connect the shielding conductor 40, the first shorting bar 400, and the medium electrode 160. Further, the second connection portion 41 may simultaneously connect the shielding conductor 40, the second shorting bar 500, and the medium electrode 160.

Figure 8:
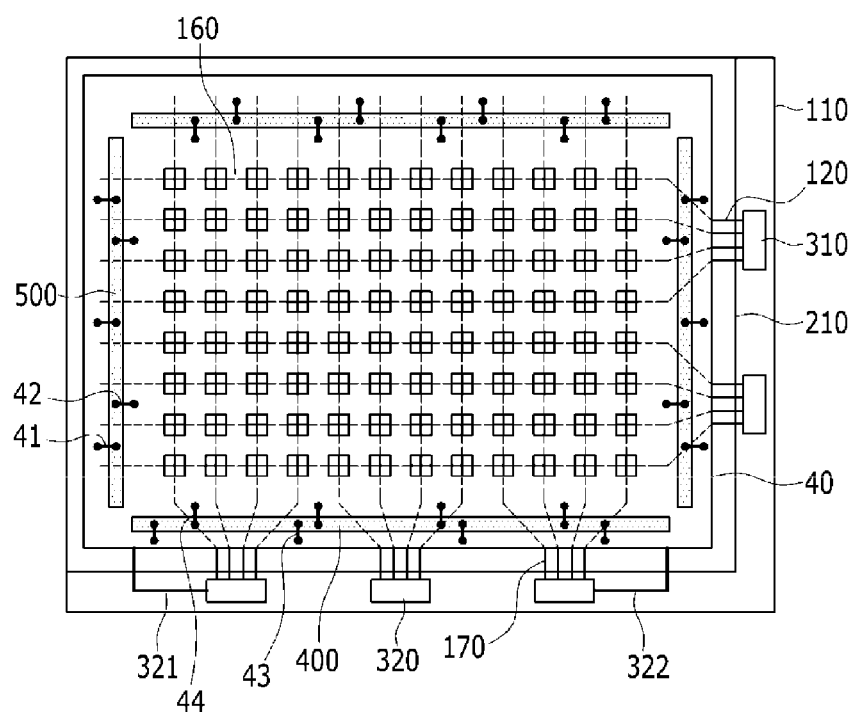
FIG. 8 is a layout view of a liquid crystal display according to a fourth exemplary embodiment of the present invention.

FIG. 8 shows a layout view of a liquid crystal display according to a fourth exemplary embodiment of the present invention.

When compared to the second exemplary embodiment, the difference between the fourth exemplary embodiment and the second exemplary embodiment is that for the fourth exemplary embodiment the shielding conductor 40 is integrated with the medium electrode 160. As described above, in the case where the shielding conductor 40 and the medium electrode 160 are connected to each other, some of the connection portions 41, 42, 43, and 44 may be omitted. For example, only one out of the first connection portion 43 and the second connection portion 44 may be formed, and only one of the third connection portion 41 and the fourth connection portion 42 may be formed.

Figure 9:
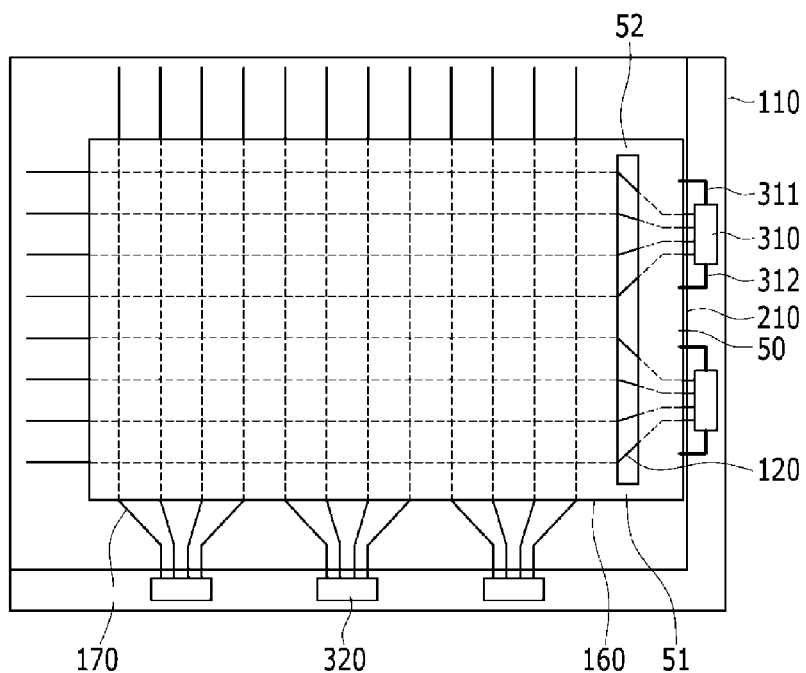
FIG. 9 is a layout view of a liquid crystal display according to a fifth exemplary embodiment of the present invention.
Figure 10:
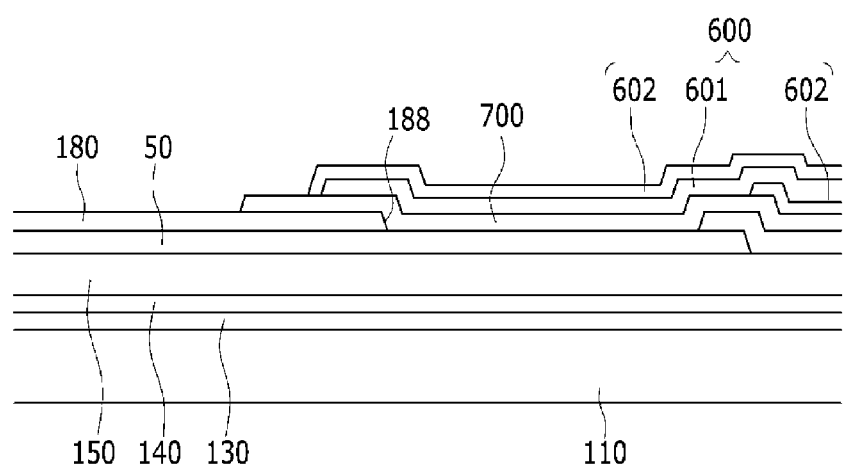
FIG. 10 is a cross-sectional view of a connection portion of a shielding conductor and a dummy pin of a gate driving circuit in the liquid crystal display according to the fifth exemplary embodiment of the present invention.

FIG. 9 shows a layout view of a liquid crystal display according to a fifth exemplary embodiment of the present invention. FIG. 10 shows a cross-sectional view of a connection portion of a shielding conductor and a dummy pin of a gate driving circuit in the liquid crystal display according to the fifth exemplary embodiment of the present invention.

The fifth exemplary embodiment is described with reference to FIG. 9 and FIG. 10.

When compared to the first exemplary embodiment, the difference between the liquid crystal display according to the fifth exemplary embodiment and that of the first exemplary embodiment is that, for the fifth exemplary embodiment, the shielding conductor 50 is disposed only at a portion overlapping the fanout portion of the gate line 120, and the shielding conductor 50 and the medium electrode 160 are not connected in overall but partially connected through the connection portions 51 and 52. The shielding conductor 50 is connected through the dummy pins 311 and 312 of the gate driving circuit 310 to a voltage such as a common voltage Vcom. Herein, the number of connection portions 51 and 52 may be increased. The shielding conductor 50 may be formed with a uniform width.

As described above, if the shielding conductor 50 is formed, even if static electricity inflows, occurs or is generated in the liquid crystal display, it is possible to prevent the devices of the display area from being damaged by dispersing static electricity to the shielding conductor 50 formed in the peripheral area. Consequently, it is possible to prevent defects such as the instantaneous generation of an abnormal image both when the power of the liquid crystal display is on and off.

The dummy pins 311 and 312 of the gate driving circuit 310 and the connection portion of the shielding conductor 50 are described in more detail by reference to FIG. 10.

The gate driving circuit 310 may be IC (Integrated Circuit) chip, and the IC chip mounted on a tape carrier package (TCP) 600 on which a metal wiring 601 is formed. Connection pins of the IC chip are connected to the metal wiring 601 formed on the tape carrier package (TCP) 600. Most of the metal wiring 601 is surrounded by an insulating film 602, and the metal wiring 601 is partially exposed.

The gate insulating layer 130, the first passivation layer 140, and the organic insulating layer 150 are formed on the insulation substrate 110 of the liquid crystal panel. The shielding conductor 50 is formed on the organic insulating layer 150 and the second passivation layer 180 is formed on the shielding conductor 50. A contact hole 188 exposing a portion of the shielding conductor 50 is formed in the second passivation layer 180.

The tape carrier package (TCP) 600 on which the gate driving circuit 310 is mounted is further mounted on the passivation layer 180. In this case, an opening through which the metal wiring 601 is exposed of the tape carrier package (TCP) 600 is disposed at a position corresponding to the contact hole 188. An anisotropic conductive film 700 is disposed between the tape carrier package (TCP) 600 and the passivation layer 180 to electrically connect the metal wiring 601 exposed through the opening and the shielding conductor 50 exposed through the contact hole 188.

The dummy pins 311 and 312 of the gate driving circuit 310 and the connection portion of the shielding conductor 50 may be connected through another metal wiring layer formed on the insulation substrate 110. Such an exemplary embodiment will be described referring to FIG. 11.

Figure 11:
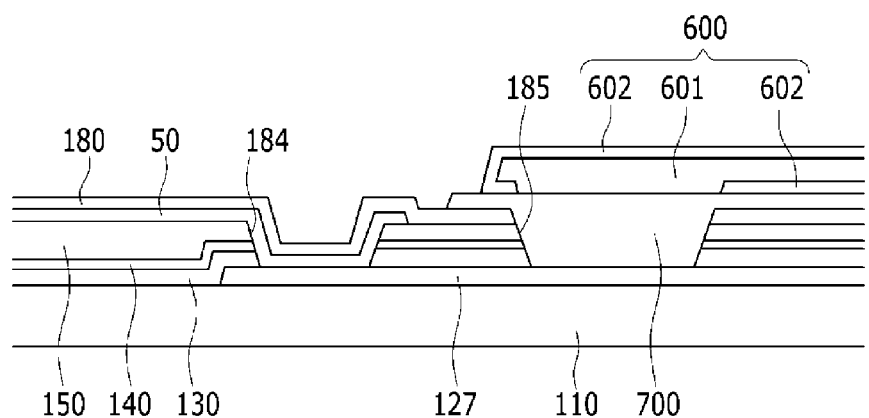
FIG. 11 is a cross-sectional view of a connection portion of a shielding conductor and a dummy pin of a gate driving circuit in a liquid crystal display according to a sixth exemplary embodiment of the present invention.

FIG. 11 shows a cross-sectional view of a connection portion of a shielding conductor and a dummy pin of a gate driving circuit in a liquid crystal display according to a sixth exemplary embodiment of the present invention.

The tape carrier package (TCP) 600 on which the gate driving circuit 310 is mounted has the same structure as that of the fifth exemplary embodiment.

A connection wiring 127 is formed on the insulation substrate 110 of the liquid crystal panel, and the gate insulating layer 130, the first passivation layer 140, and the organic insulating layer 150 are formed on the connection wiring 127. A portion of the connection wiring 127 is exposed through a contact hole 184 formed through the gate insulating layer 130, the first passivation layer 140, and the organic insulating layer 150. The shielding conductor 50 is formed on the organic insulating layer 150 to be connected through the contact hole 184 to the connection wiring 127. The second passivation layer 180 is formed on the shielding conductor 50, and another portion of the connection wiring 127 is exposed through a contact hole 185 formed through the gate insulating layer 130, the first passivation layer 140, the organic insulating layer 150, and the second passivation layer 180.

The tape carrier package (TCP) 600 on which the gate driving circuit 310 is mounted is mounted on the passivation layer 180. In this case, an opening through which the metal wiring 601 is exposed of the tape carrier package (TCP) 600 is disposed at a position corresponding to the contact hole 185. An anisotropic conductive film 700 is disposed between the tape carrier package (TCP) 600 and the passivation layer 180 to electrically connect the metal wiring 601 exposed through the opening and the wiring connection portion 127 exposed through the contact hole 185.

Figure 12:
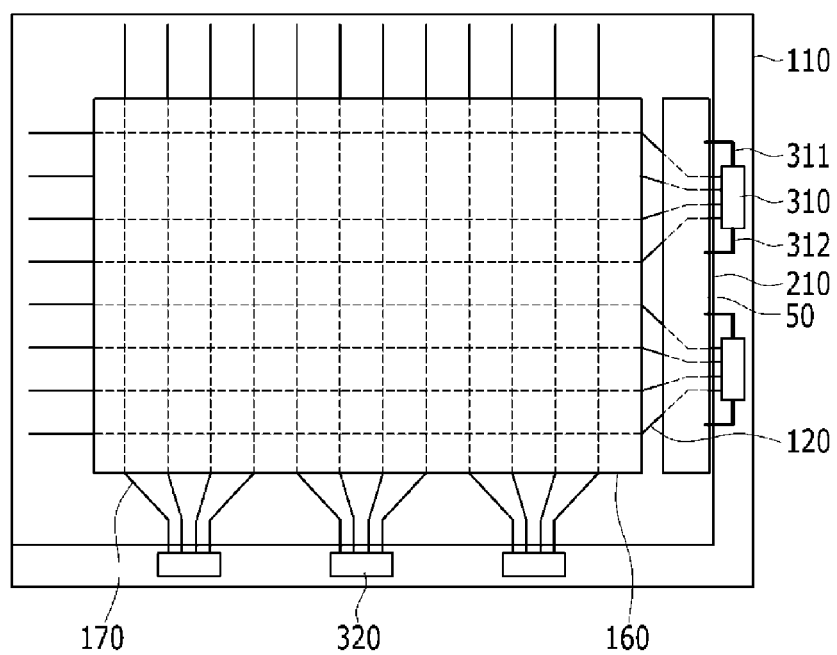
FIG. 12 to FIG. 15 are each a layout view of liquid crystal displays according to seventh to tenth exemplary embodiments of the present invention.

Referring to FIG. 12, a seventh exemplary embodiment of the present invention is described.

When compared to the fifth exemplary embodiment, the difference between the liquid crystal display according to the seventh exemplary embodiment and that of the fifth exemplary embodiment is that there are no connection portions 51 and 52 connecting the shielding conductor 50 and the medium electrode 160. This way, it is possible to prevent charges accumulated in the shielding conductor 50 from affecting the voltage of the medium electrode 160 by separating the shielding conductor 50 from the medium electrode 160 and separately applying voltage thereto. As a result, static electricity generated during the process of manufacturing the liquid crystal display may be accumulated in the shielding conductor 50 having high capacitance and then move to the medium electrode 160 disposed in the display area, thereby preventing an influence on the image. Since the shielding conductor 50 is connected through the dummy pin and the like to the gate driving circuit 310 to independently receive a common voltage, a ground voltage or the like, the voltage of the shielding conductor 50 is very stably maintained. Further, it is possible to prevent the problem of charge accumulation in the shielding conductor 50 by discharging the charge accumulated in the shielding conductor 50 during the manufacturing process through the dummy pin to the outside. Herein, the shielding conductor 50 may be formed such as to have a uniform width.

Figure 13:
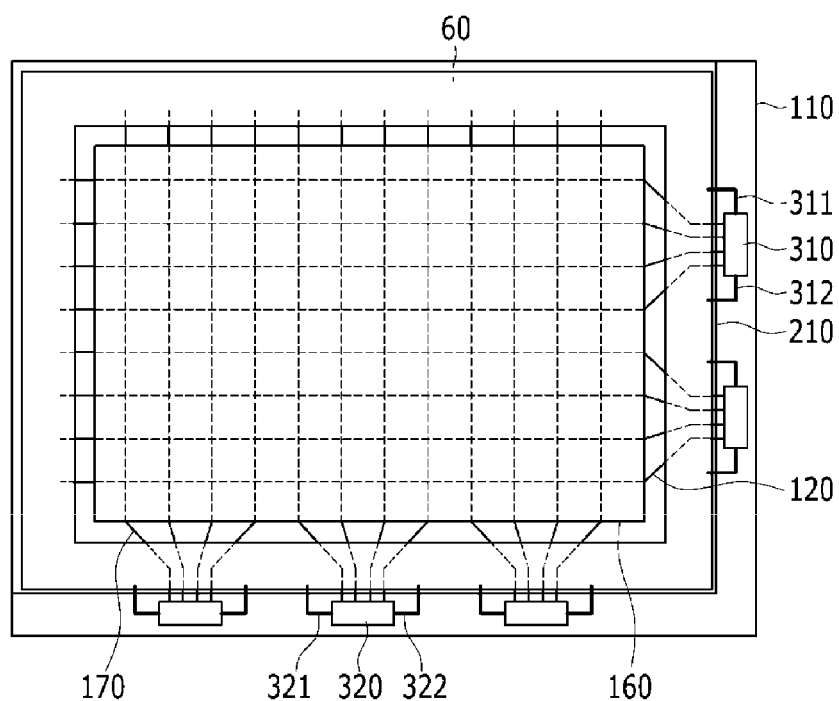

Referring to FIG. 13, an eighth exemplary embodiment of the present invention is described.

When compared to the seventh exemplary embodiment, the difference between the liquid crystal display according to the eighth exemplary embodiment and that of the seventh exemplary embodiment is that the shielding conductor 60 has a loop form surrounding the medium electrode 160 and a voltage such as a common voltage, a ground voltage or the like may be applied through the dummy pins 321 and 322 of the data driving circuit 320 to the shielding conductor 60. If the shielding conductor 60 is formed on all four sides of the quadrangle display area, the shielding conductor 60 has a capacitance which is more suitable for preventing the problems caused by static electricity.

Figure 14:
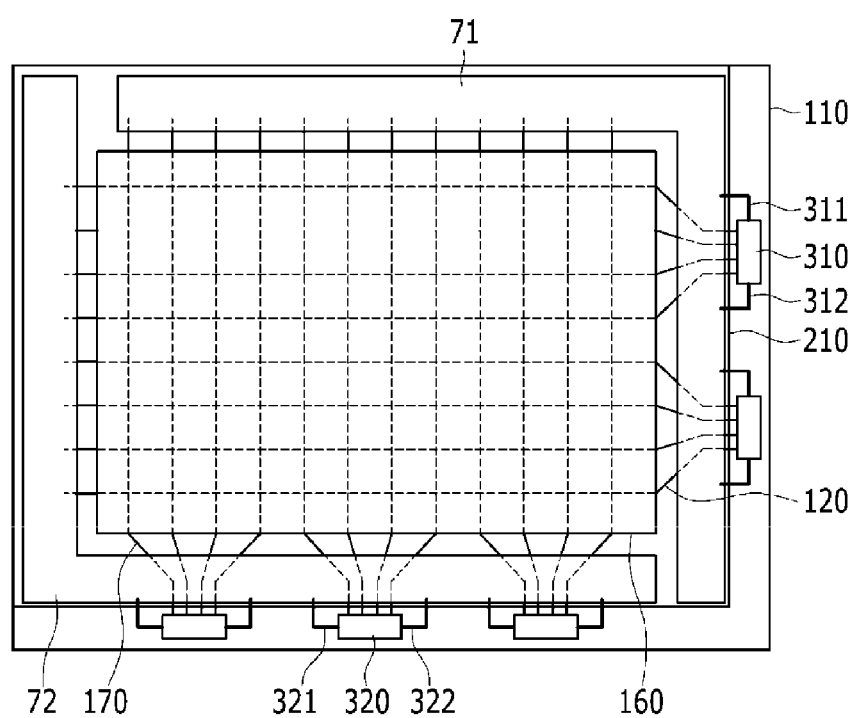

Referring to FIG. 14, a ninth exemplary embodiment of the present invention is described.

When compared to the eighth exemplary embodiment, the difference between the liquid crystal display according to the ninth exemplary embodiment and that of the eighth exemplary embodiment is that the shielding conductors 71 and 72 are separated into two portions. The first shielding conductor 71 is disposed in a "┐" shape and connected to the dummy pins 311 and 312 of the gate driving circuit 310, and the second shielding conductor 72 is disposed in a "└" shape and connected to the dummy pins 321 and 322 of the data driving circuit 320. As described above, if the first shielding conductor 71 and the second shielding conductor 72 are separated from each other and the voltage is applied through the gate driving circuit 310 and the data driving circuit 320, if necessary, different voltages may be applied to the first shielding conductor 71 and the second shielding conductor 72. In the shielding conductors 71 and 72, a portion extending in a horizontal direction and a portion extending in a vertical direction may be each formed such as to have uniform width.

Figure 15:
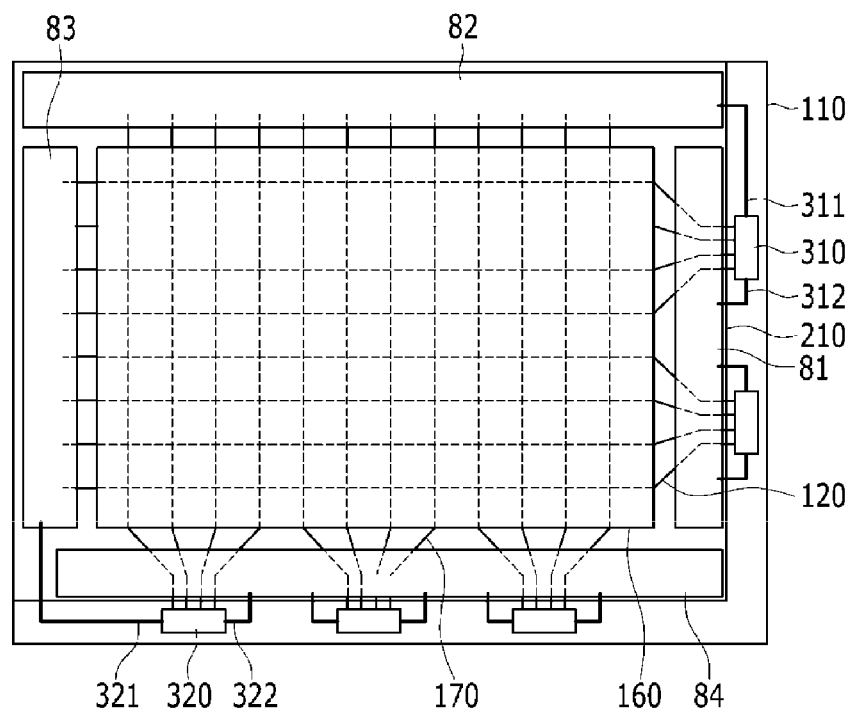

Referring to FIG. 15, a tenth exemplary embodiment of the present invention is described.

When compared to the ninth exemplary embodiment, the difference between the liquid crystal display according to the tenth exemplary embodiment and that of the ninth exemplary embodiment is that the shielding conductors 81, 82, 83, and 84 are separated into four portions. The first shielding conductor 81 and the second shielding conductor 82 are connected to different dummy pins 311 and 312 of the gate driving circuit 310, and the third shielding conductor 83 and the fourth shielding conductor 84 are connected to different dummy pins 321 and 322 of the data driving circuit 320. Accordingly, if necessary, different voltages may be applied to the four shielding conductors 81, 82, 83, and 84. The shielding conductors 81, 82, 83, and 84 may be each formed such as to have uniform width.

In exemplary embodiments of the present invention, the gate driving circuit 310 and the data driving circuit 320 may be implemented as an IC (integrated chip) or a circuit directly formed on the insulation substrate 110.

Although exemplary embodiments of the present invention are described in relation to liquid crystal displays the invention may be applied to other types of displays, such as organic light emitting diode displays, electro-wetting displays, and others.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a first insulation substrate comprising a display area and a peripheral area outside the display area;
a plurality of first signal lines disposed on the first insulation substrate;
a plurality of second signal lines disposed on the first insulation substrate and crossing the first signal lines;
a plurality of switching elements connected to the first signal lines and the second signal lines and disposed in the display area;
a plurality of pixel electrodes disposed in the display area, wherein each pixel electrode is connected to a switching element;
a medium electrode disposed in the display area, wherein the medium electrode and the pixel electrodes are configured to form an electric field to drive liquid crystals; and
a shielding conductor disposed in the peripheral area and extending along at least one side of the display area,
wherein the shielding conductor is disposed on the same layer as the medium electrode and the medium electrode extends such that it is directly and electrically connected to the shielding conductor.

2. The display device of claim 1, further comprising:
a shorting bar disposed in the peripheral area and electrically connected to the shielding conductor.

3. The display device of claim 2, wherein:
the shielding conductor forms a loop surrounding the display area such that the shorting bar is disposed on all sides of the display area.

4. The display device of claim 1, further comprising:
a second substrate facing the first substrate and a black matrix disposed on the second substrate,
wherein the shielding conductor overlaps a portion of the black matrix disposed in the peripheral area.

5. A display device, comprising:
a first insulation substrate comprising a display area and a peripheral area outside the display area;
a plurality of first signal lines disposed on the first insulation substrate;
a plurality of second signal lines disposed on the first insulation substrate and crossing the first signal lines;
a plurality of switching elements connected to the first signal lines and the second signal lines and disposed in the display area;
a plurality of pixel electrodes disposed in the display area, wherein each pixel electrode is connected to a switching element;
a shielding conductor disposed in the peripheral area and extending along at least one side of the display area; and
first and second shorting bars disposed in the peripheral area and electrically connected to the shielding conductor,
wherein:
the first shorting bar is disposed on the same layer as the first signal lines and is parallel to the first signal lines; and
the second shorting bar is disposed on the same layer as the second signal lines and is parallel to the second signal lines.

6. The display device of claim 5, wherein:
the shielding conductor and the medium electrode are disposed on different layers; and
the shielding conductor and the medium electrode are connected to each other through a connecting member.

7. The display device of claim 5, further comprising:
a medium electrode disposed in the display area, wherein the medium electrode and the pixel electrodes are configured to form an electric field to drive the liquid crystals,
wherein the first and second shorting bars and the shielding conductor are electrically connected to the medium electrode.

8. The display device of claim 7, wherein the first and second shorting bars, the shielding conductor, and the medium electrode are disposed on different layers and are connected to each other through a connecting member.

9. The display device of claim 5, further comprising:
a first driving circuit disposed in the peripheral area and configured to apply a signal voltage to the first signal lines; and
a second driving circuit disposed in the peripheral area and configured to apply a signal voltage to the second signal lines;
wherein the shielding conductor is configured to receive a voltage through at least one dummy pin of the first driving circuit and the second driving circuit.

10. The display device of claim 9, further comprising:
a medium electrode disposed in the display area, wherein the medium electrode and the pixel electrodes are configured to form an electric field to drive the liquid crystals; and
a connection portion partially connecting the shielding conductor and the medium electrode.

11. The display device of claim 9, further comprising:
a medium electrode disposed in the display area, wherein the medium electrode and the pixel electrodes are configured to form an electric field to drive the liquid crystals, and wherein the medium electrode is electrically separated from the shielding conductor.

12. The display device of claim 11, wherein:
the shielding conductor forms a loop surrounding the display area.

13. A display device, comprising:
a first insulation substrate comprising a display area and a peripheral area outside the display area;
a plurality of first signal lines disposed on the first insulation substrate;
a plurality of second signal lines disposed on the first insulation substrate and crossing the first signal lines;
a plurality of switching elements connected to the first signal lines and the second signal lines and disposed in the display area;
a plurality of pixel electrodes disposed in the display area, wherein each pixel electrode is connected to a switching element;

a first driving circuit disposed in the peripheral area and configured to apply a signal voltage to the first signal lines;
a second driving circuit disposed in the peripheral area and configured to apply a signal voltage to the second signal lines;
a plurality of shielding conductors separated from each other, disposed in the peripheral area, extending along sides of the display area, and configured to receive voltages through a plurality of dummy pins of the first driving circuit and the second driving circuit; and
a medium electrode disposed in the display area,
wherein:
the medium electrode and the pixel electrodes are configured to form an electric field to drive the liquid crystals;
the medium electrode is electrically separated from the shielding conductor; and,
at least one of the shielding conductors is connected to a dummy pin of the first driving circuit, and at least another one of the shielding conductors is connected to a dummy pin of the second driving circuit.

14. The display device of claim 13, wherein the shielding conductors surround the display area.

15. The display device of claim 13, wherein:
the plurality of shielding conductors comprise first, second, third, and fourth shielding conductors separated from each other;
the first and the second shielding conductors are connected to a dummy pin of the first driving circuit; and
the third and the fourth shielding conductors are connected to a dummy pin of the second driving circuit.

16. The display device of claim 15, wherein:
the first shielding conductor and the second shielding conductor are connected to different dummy pins of the first driving circuit, and
the third shielding conductor and the fourth shielding conductor are connected to different dummy pins of the second driving circuit.

17. The display device of claim 16, wherein:
the display area is quadrangle, and the first, second, third, and fourth shielding conductors are respectively disposed on the first, second, third and fourth sides of the display area.

* * * * *